(12) United States Patent
Davis et al.

(10) Patent No.: US 10,961,952 B1
(45) Date of Patent: Mar. 30, 2021

(54) AIR-BREATHING ROCKET ENGINE

(71) Applicant: Mountain Aerospace Research Solutions, Inc., Whitefish, MT (US)

(72) Inventors: Aaron Davis, Whitefish, MT (US); Scott Stegman, Santa Barbara, CA (US)

(73) Assignee: Mountain Aerospace Research Solutions, Inc., Whitefish, MT (US)

( * ) Notice: Subject to any disclaimer, the term of this patent is extended or adjusted under 35 U.S.C. 154(b) by 0 days.

(21) Appl. No.: 16/776,325

(22) Filed: Jan. 29, 2020

(51) Int. Cl.
| | |
|---|---|
| *F02K 9/78* | (2006.01) |
| *F02K 9/52* | (2006.01) |
| *F02K 9/60* | (2006.01) |
| *F02K 7/18* | (2006.01) |
| *F02K 9/62* | (2006.01) |

(52) U.S. Cl.
CPC ............. *F02K 9/52* (2013.01); *F02K 7/18* (2013.01); *F02K 9/60* (2013.01); *F02K 9/62* (2013.01); *F02K 9/78* (2013.01)

(58) Field of Classification Search
CPC ..... F02K 7/18; F02K 9/42; F02K 9/62; F02K 9/78
See application file for complete search history.

(56) References Cited

U.S. PATENT DOCUMENTS

| | | | |
|---|---|---|---|
| 2,735,263 A * | 2/1956 | Charshafian | F02K 7/18 60/260 |
| 3,200,589 A | 8/1965 | Mower et al. | |
| 4,428,191 A | 1/1984 | Lane et al. | |
| D273,579 S | 4/1984 | Martin et al. | |
| 4,471,609 A | 9/1984 | Porter et al. | |
| 5,127,602 A | 7/1992 | Batey et al. | |
| 5,224,344 A | 7/1993 | Keirsey et al. | |

(Continued)

FOREIGN PATENT DOCUMENTS

| | | |
|---|---|---|
| CA | 2677423 A1 | 8/2008 |
| EP | 1515035 A2 | 3/2005 |

(Continued)

OTHER PUBLICATIONS

U.S. Appl. No. 16/828,285, filed Mar. 24, 2020.

(Continued)

*Primary Examiner* — Todd E Manahan
*Assistant Examiner* — Kyle Robert Thomas
(74) *Attorney, Agent, or Firm* — Perkins Coie LLP; Jordan Becker

(57) ABSTRACT

An air-breathing rocket engine with an hourglass-shaped outer shell and an interior portion situated entirely within the front end of the outer shell. The interior portion includes a funnel-shaped intake that terminates in a floor and an inner front wall that forms a first circumferential gap between the inner front wall and the outer surface of the funnel-shaped intake. The intake has a central aperture that is in fluid communication with the throat and exhaust areas within the outer shell. A second circumferential gap is formed between the outer surface of the front inner wall and the inner surface of the front end of the outer shell and is in fluid communication with the throat and exhaust areas within the outer shell. One or more injector ports and one or more ignition ports are situated at the front end of the second circumferential gap.

10 Claims, 6 Drawing Sheets

(56) References Cited

U.S. PATENT DOCUMENTS

| | | |
|---|---|---|
| 5,282,359 A | 2/1994 | Chester |
| 5,727,378 A | 3/1998 | Seymour |
| 2005/0060982 A1 | 3/2005 | Mani et al. |
| 2007/0245741 A1 | 10/2007 | Johnson et al. |
| 2010/0008772 A1 | 1/2010 | Vauchel et al. |
| 2010/0205933 A1 | 8/2010 | Mungas et al. |
| 2013/0014515 A1 | 1/2013 | Bellabal et al. |
| 2014/0161618 A1 | 6/2014 | Walker et al. |
| 2014/0352797 A1 | 12/2014 | Aten et al. |
| 2015/0377033 A1 | 12/2015 | Xu |
| 2016/0040552 A1 | 2/2016 | Rahaim et al. |
| 2016/0169516 A1 | 6/2016 | Low et al. |
| 2016/0186689 A1 | 6/2016 | Bartel et al. |
| 2017/0159490 A1 | 6/2017 | Sennoun |
| 2018/0038278 A1 | 2/2018 | Taliercio et al. |
| 2018/0073391 A1 | 3/2018 | Jennings |
| 2018/0280851 A1 | 10/2018 | Klaus et al. |
| 2020/0052570 A1 | 2/2020 | Holcomb |

FOREIGN PATENT DOCUMENTS

| | | |
|---|---|---|
| JP | 2013019330 A | 1/2013 |
| WO | 2014196634 A1 | 12/2014 |
| WO | 2018115731 A1 | 6/2018 |

OTHER PUBLICATIONS

Non-Final Office Action cited in U.S. Appl. No. 16/828,285 dated Dec. 8, 2020.
Berkeley, Duncan , "Ejectors", Petroleum Refiner.
Salmi, Bryce , "The World's Largest 3D Metal Printer is Churning Out Rockets", IEEE Spectrum.
U.S. Appl. No. 17/094,733, filed Nov. 10, 2020.

\* cited by examiner

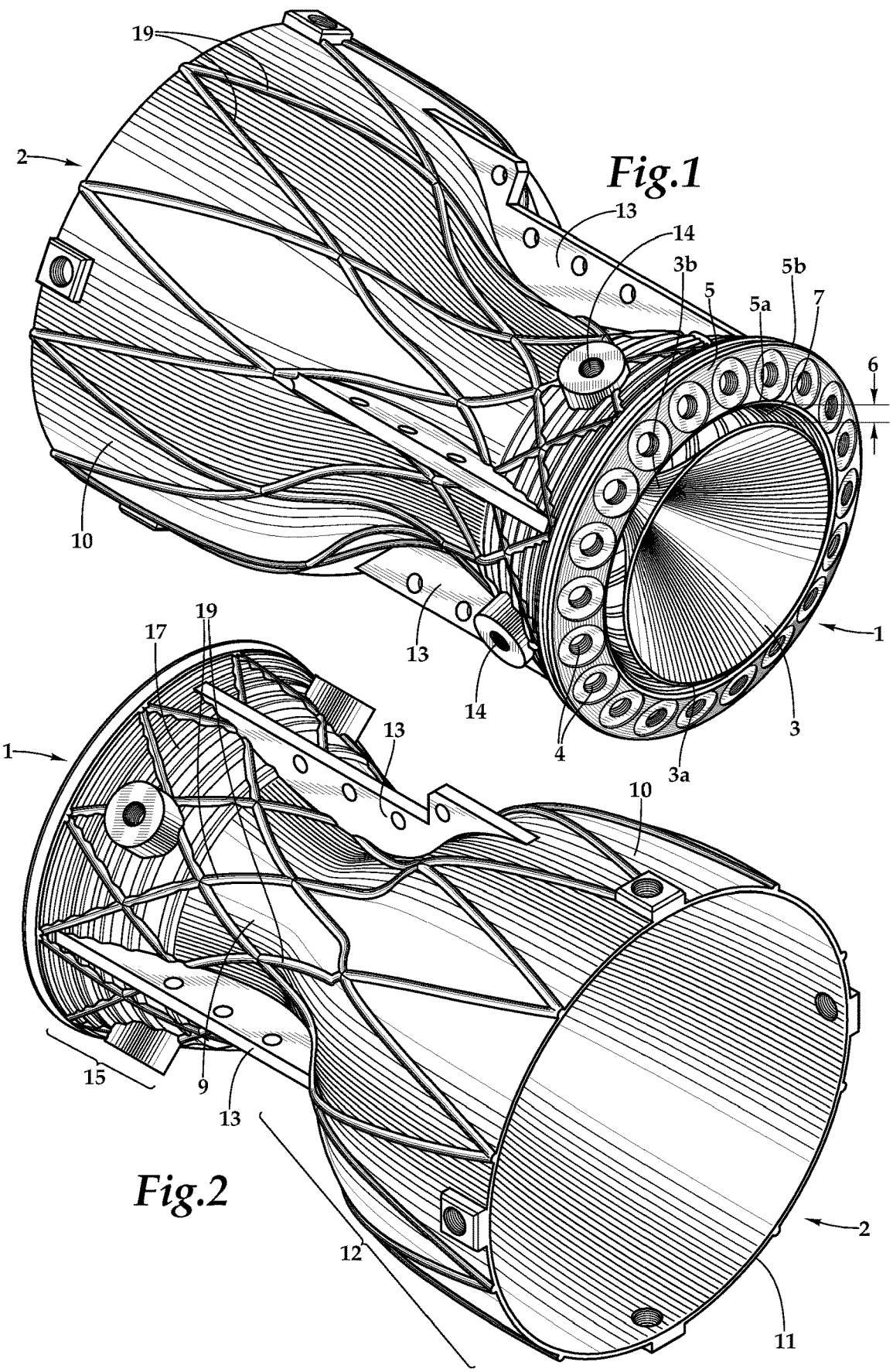

AIR-BREATHING ROCKET ENGINE

BACKGROUND OF THE INVENTION

1. Field of the Invention

The present invention relates generally to the field of propulsion engines, and more particularly, to a rocket engine with no moving parts that intakes ambient fluid for use as free reaction mass and is capable of using oxidizer contained within the fluid for the combustion cycle.

2. Description of the Related Art

There are two major differences between rocket engines and jet engines. The first is that rocket engines must carry not only all of their own fuel into space but also a source of oxygen to burn that fuel. Jet engines, on the other hand, carry fuel, but they use oxygen from the air to burn that fuel. The second major difference is that jet engines have an air intake and an exhaust opening, whereas rocket engines typically receive fuel and oxidizer via a closed manifold system and have only an exhaust opening. Both types of engines produce thrust through an internal pressure difference, and both eject exhaust gases in a direction that is opposite to that of the path of travel of the engine.

Current jet engine designs, including marine and aerospace jet engines, rely on moving parts such as impellers or compressors in order to function. These moving parts increase manufacturing and maintenance costs and present performance risk. For example; a fault in the turbine or compressor blades in an aerospace engine can result in catastrophic failure of the entire engine and loss of life. The present invention requires no maintenance beyond verifying structural integrity of the engine body and fuel systems. Some examples of innovations in engine design are set forth below; none of these inventions is similar to the present invention in terms of structure or performance.

U.S. Pat. No. 4,428,191 (Lane et al., 1984) entitled "Fuel Combustion in Ducted Flow" provides a combustion apparatus with a duct for containing a flow of air and an air-fuel mixing device having an assembly of transversely spaced longeron members extending along the duct. The longeron members are inclined to the general direction of flow through the duct and to the walls of the duct so that a major portion of the flow through the duct will pass through the spaces between the longeron members. The longitudinal edges of the longeron members are adapted to shed continuous vortices. A baffle extends across the upstream end of the longeron members and forms a sheltered pilot combustion zone. The invention further comprises means for generating pilot vortices of combustible mixture in the pilot zone, causing each pilot vortex to divide, and directing the divided portion of each pilot vortex to pass downstream along adjacent parts of adjacent longeron members.

U.S. Pat. No. 5,282,359 (Chester, 1994) entitled "Impulse Jet Engine" describes a jet engine with no moving parts and a toroidal combustion chamber. A toroidal exhaust port directs exhaust gases radially inward and toward the engine outlet. The exhaust gases induce a secondary air flow through the engine, and the entrained secondary air enters the engine inlet, thereby cooling and slowing the exhaust gases. In an alternate embodiment, the trailing end of the housing is frustoconical, and the exhaust port directs the exhaust gases to converge toward one another, thereby causing the entrained air to flow in a converging pattern. In both embodiments, the mass of the entrained, secondary air is large relative to the mass of the exhaust gases so that the secondary air flows through the engine at a relatively low velocity.

U.S. Pat. No. 5,727,378 (Seymour, 1998) entitled "Gas Turbine Engine" discloses a small, "air-breathing" gas turbine engine. The engine comprises a flame-free primary mixing zone in the combustion chamber, a primary combustion zone, a secondary combustion zone, and a dilution zone. A bearing assembly is located between a compressor and a turbine wheel. A cooling cavity is situated between the turbine wheel and the bearing assembly. The invention also comprises a toroidally-shaped compressor discharge plenum, which is between the compressor and the turbine wheel. The toroidally-shaped compressor discharge plenum acts as an air accumulator, an air shock absorber, and an air stabilizer.

U.S. Patent Application Pub. No. 20180038278 (Taliercio et al.) entitled "Constant-Volume Combustion System for a Turbine Engine of an Aircraft Engine" provides a combustion system for a turbine engine in which a plurality of combustion chambers is regularly distributed around a longitudinal axis. A toroidal manifold includes a radially oriented outlet for supplying compressor air to each combustion chamber. A toroidal exhaust pipe with a radially oriented inlet collects the combustion gases from the combustion chambers, which are radially positioned between the manifold outlet and the exhaust pipe inlet. The drawing in of the compressed air from the manifold outlet and the ejection of combustion gas toward the exhaust pipe are controlled by a timing device for each chamber.

BRIEF SUMMARY OF THE INVENTION

The present invention is an engine comprising: an outer shell, the outer shell being hourglass-shaped and having a front end, a throat area, and an exhaust, the throat area being situated between the front end and the exhaust, the throat area have a smaller inner diameter than the front end or the exhaust; a funnel-shaped intake situated at least partially inside of the front end of the outer shell and terminating in a floor; a circumferential front ledge forming a perimeter of the front end of the outer shell, the circumferential front ledge comprising one or more injector ports; and at least one ignition port situated on an outside of the outer shell on the front end of the outer shell between the circumferential front ledge and the throat area; wherein the circumferential front ledge comprises an inner edge and an outer edge; wherein an inner front wall extends from the inner edge of the circumferential front ledge to the floor; wherein the intake comprises an outer wall that forms a skirt over the floor; wherein the outer wall of the intake, the inner front wall, and the skirt are configured to form a first circumferential gap between the intake and the inner front wall, the first circumferential gap not being in fluid communication with the throat or the exhaust; wherein the first circumferential gap has an inner diameter, and the inner diameter of the first circumferential gap widens from a front end of the first circumferential gap to the skirt; wherein the inner front wall comprises an outer surface, wherein the outer shell comprises an inner surface, and wherein the outer surface of the front inner wall and the inner surface of the front end of the outer shell are configured to form a second circumferential gap, the second circumferential gap being in fluid communication with the at least one injector port and the at least one ignition port; wherein the second circumferential gap has an inner diameter, and the inner diameter of the second circumferential gap decreases at a terminal end of the second circumferential gap, the terminal end of the second circumferential gap being aligned laterally with the floor; wherein the second circumferential gap is in fluid communication with the throat and exhaust; wherein the intake has an inner diameter that decreases from a front edge of the intake to a point forward of the floor and increases from said point to the floor; wherein the intake comprises a central aperture that extends from the front edge of the intake to the floor and is in fluid communication with the throat area and exhaust; wherein the throat area comprises a front end, and the terminal end of the second circumferential gap is situated at the front end of the throat area; wherein the throat area is in fluid communication with the exhaust; and wherein the central aperture of the intake terminates at the front end of the throat area.

In a preferred embodiment, the outer shell comprises an outer surface, and the outer surface of the outer shell comprises a plurality of crisscrossed ridges. In another preferred embodiment, the inner front wall comprises an inner surface, and the inner surface of the inner front wall comprises a plurality of circumferential ridges. In one embodiment, a front end of the first circumferential gap is open to the atmosphere.

In a preferred embodiment, the outer edge of the circumferential front ledge has a diameter, the outer shell comprises a rear edge, the rear edge is circular in shape, the rear edge has an outer diameter, and the outer diameter of the rear edge of the outer shell is greater than the diameter of the outer edge of the front circumferential ledge. In another preferred embodiment, the floor has a perimeter, and the perimeter of the floor or bulbous in shape with a rounded circumferential outer edge. In yet another referred embodiment, the floor is angled upward toward the central aperture of the intake.

In a preferred embodiment, the floor has a width, the central aperture has a width, and the front edge of the intake has a width; and the width of the floor is greater than the width of the central aperture but less than the width of the front edge of the intake. In another preferred embodiment, the throat area comprises a center part with an inner diameter, the rear edge of the outer shell has an inner diameter, and the inner diameter of the center part of the throat area is approximately 0.5 times the inner diameter of the rear edge of the outer shell. In yet another preferred embodiment, the inner diameter of the second circumferential gap is constant except at the terminal end, and the inner diameter of the second circumferential gap at the terminal end is approximately 0.38 times the inner diameter of the second circumferential gap other than at the terminal end.

BRIEF DESCRIPTION OF THE DRAWINGS

FIG. 1 is a front perspective view of the present invention.
FIG. 2 is a rear perspective view of the present invention.

REFERENCE NUMBERS

Figure 3:
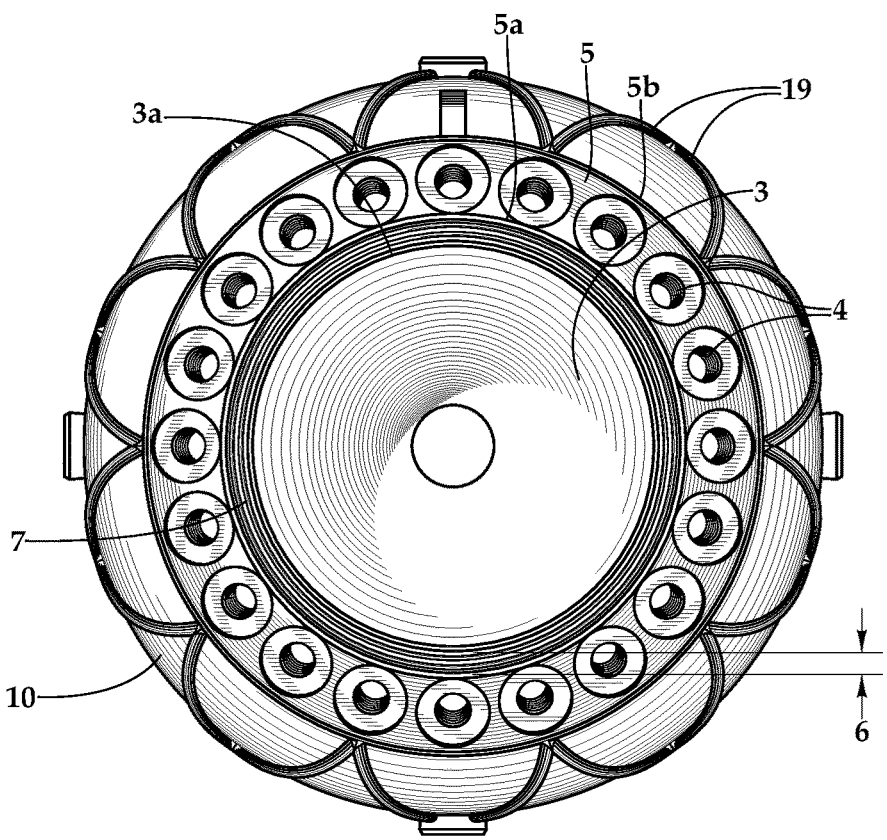
FIG. 3 is a front view of the present invention.

1 Front end (of invention)
2 Rear end (of invention)
3 Funnel-shaped intake
3a Front edge (of intake)
3b Outer wall (of intake)
4 Fuel/oxidizer injector port
5 Circumferential front ledge
5a Inner edge (of circumferential front ledge)
5b Outer edge (of circumferential front ledge)
6 First circumferential gap
7 Inner front wall
7a Center (of inner front wall)
8 Floor
8a Rounded outer edge (of floor)
8b Skirt
9 Throat area
10 Outer shell
11 Rear edge (of invention)
12 Exhaust
13 Mounting bracket
14 Ignition port
15 Front end (of outer shell)
16 Second circumferential gap
17 Circumferential ridges (on front end of outer shell)
18 Circumferential ridges (on inside surface of inner front wall)
19 External ridges
20 Central aperture (of intake)
21 Interior portion (of invention)

DETAILED DESCRIPTION OF INVENTION

FIG. 1 is a front perspective view of the present invention. As shown in all of the figures, the present invention is a single piece of material with no moving parts. This fact, in and of itself, distinguishes the present invention from all other engines. In a preferred embodiment, this material is an INCONEL® nickel-chromium alloy or any other refractory superalloy. Referring to FIGS. 1 and 2, the present invention comprises a front end 1 and a rear end 2. The front end of the invention comprises a funnel-shaped intake 3 and a plurality of fuel and oxidizer injector ports 4. The funnel-shaped intake faces forward so that the widest part of the intake forms a mouth at the front end 1 of the invention. The plurality of fuel and oxidizer injector ports 4 are disposed radially around a perimeter of the front end of the invention and surround the front edge 3a of the intake 3 (with a gap 6 between the circumferential front ledge 5 and the front edge 3a of the intake 3). The plurality of fuel and oxidizer injector ports 4 are situated on a circumferential front ledge 5 that forms the perimeter of the front end 1 of the invention.

The circumferential front ledge 5 is preferably angled downward so that the inner edge 5a of the circumferential front ledge 5 is slightly closer to the front end 1 of the invention than the outer edge 5b of the circumferential front ledge 5. Thus, the fuel and oxidizer injector ports are at about a forty-five-degree (45°) angle relative to a longitudinal axis of the invention or about a one hundred thirty-five-degree (135°) angle relative to a lateral axis of the invention (see FIG. 5). The front edge 3a of the intake 3 preferably extends forwardly of the inner edge 5a of the circumferential front ledge 5 so that the front edge 3a of the intake 3 is the forward-most part of the invention (see FIG. 5). The front edge 3a of the intake 3, the inner edge 5a of the circumferential front ledge 5, and the outer edge of the circumferential front ledge 5 are all preferably circular in shape.

As noted above, there is a first circumferential gap 6 between the front edge 3a of the intake 3 and the inner edge 5a of the circumferential front ledge 5. This first circumferential gap 6 lies between the outer wall 3b of the intake 3 and an inside surface of an inner front wall 7 that is situated directly underneath (rearward) of the inner edge 5a of the circumferential front ledge 5 and within the outer shell 10. In one embodiment (not shown), the front end of the first circumferential gap 6 is sealed and circulates fuel before it is combusted in order to provide conductive cooling to the combustion chamber and pre-heat fuel. In another embodiment, the front end of the first circumferential gap 6 is open to the ambient air to provide cooling.

Figure 6:
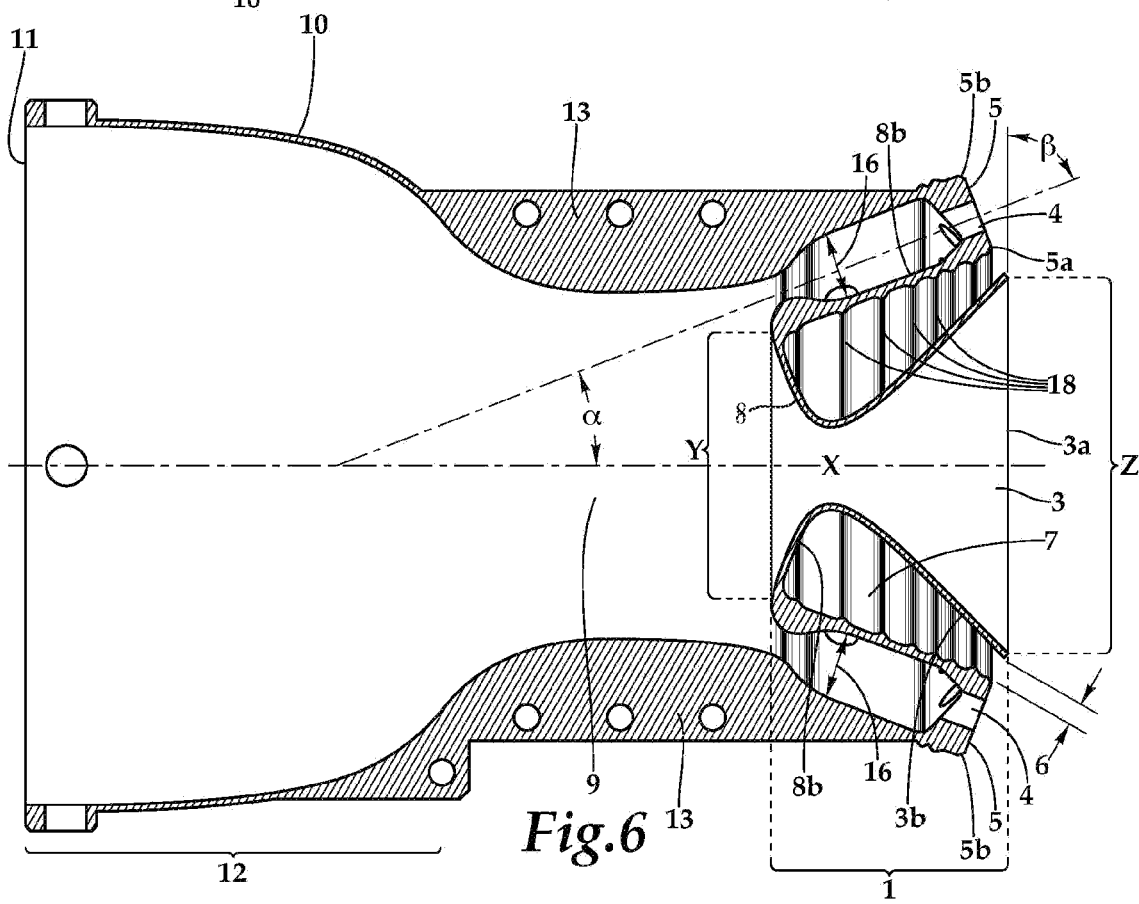
FIG. 6 is a cross-section view of the present invention taken at the line shown in FIG. 5.

The outer wall 3b of the intake 3 and the inner front wall 7 are spaced apart from one another for a certain distance and joined together at a skirt 8b (see FIG. 6). The inner front wall 7 is tapered inward (toward the center of the invention) at a relatively constant angle equal to approximately forty-five degrees (45°) relative to the longitudinal axis of the invention, whereas the funnel-shaped intake 3 tapers inward much more drastically than the inner front wall 7; therefore, the distance between the outer wall 3b of the intake 3 and the inner front wall 7 (that is, the size of the first circumferential gap 6) increases from the front end of the first circumferential gap 6 to the skirt 8b. The floor 8 is situated inside of the invention (that is, inside of the outer shell 10) just forward of the throat area 9 (see FIG. 6) and within the front end 1 of the invention (see FIG. 6). The floor 8 is inside of the skirt 8b.

The invention further comprises an outer shell 10 that extends from the outer edge 5b of the circumferential front ledge 5 to the rear edge 11 of the invention. The rear edge 11 is circular in shape and larger in diameter than the outer edge 5b of the circumferential front ledge 5. The outer shell 10 is shaped like an hourglass; it tapers inward from the outer edge 5b of the circumferential front ledge 5 to the throat area 9 (or waist) of the invention and then expands outward to the exhaust 12. Mounting brackets 13 preferably span the outer shell 10 (in a longitudinal direction) at the throat area 9 and front end 15, as shown. Two pairs of opposing ignition ports 14 are situated on the front end 15 of the outer shell 10 beneath (or rearward of) the circumferential front ledge 5. The fuel and oxidizer injector ports 4 and the ignition ports 14 are preferably threaded and configured to accept, respectively, fuel and/or oxidizer hoses and spark plugs. In a preferred embodiment, there is one ignition port 14 for every five injector ports 4. The thickness of the outer shell 10, outer wall 3b of the intake 3, and inner front wall 7 may be optimized (that is, mass may be added or decreased in certain areas) depending on modular and tensile strength requirements and localized thermal requirements.

Figure 4:
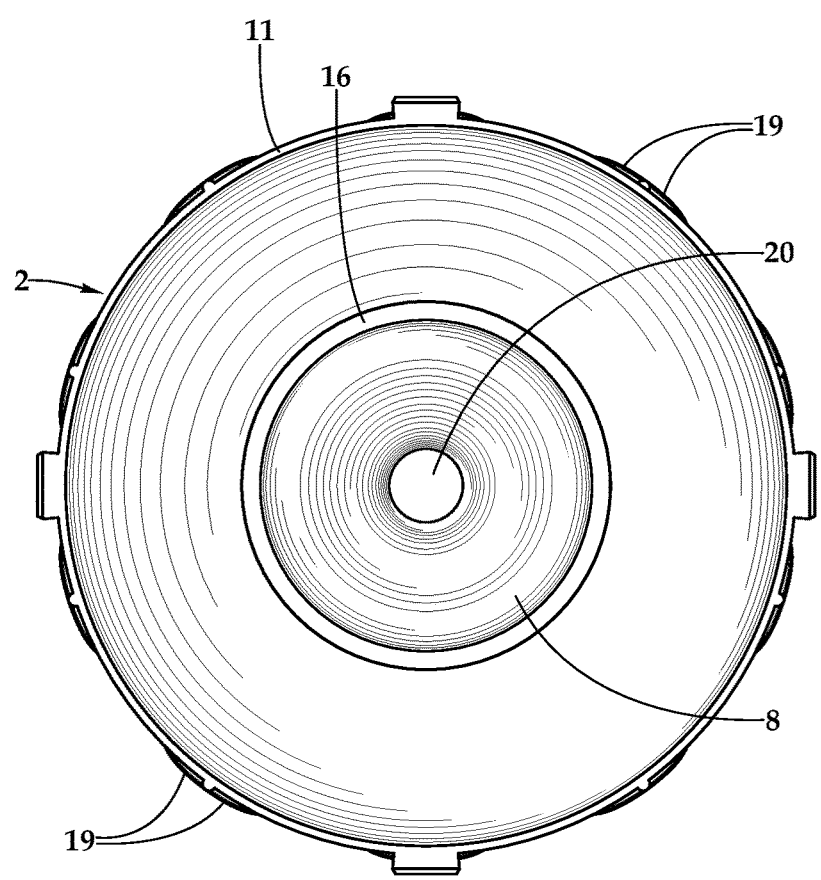
FIG. 4 is a rear view of the present invention.

There is a second circumferential gap 16 between the outside surface of the inner front wall 7 and the outer shell 10 (see FIG. 4). This second circumferential gap 16 is in fluid communication with (that is, open to) the throat area 9 and exhaust 12, whereas the first circumferential gap 6 is not. The circumferential front ledge 5 encloses the front end of the second circumferential gap 16, and the fuel and oxidizer injector ports 4 are configured to enable the injection of fuel and/or oxidizer into the second circumferential gap 16. In a preferred embodiment, the outside surface of the front end 15 of the outer shell 10 comprises a plurality of circumferential ridges 17 (also referred to as "hat banding" or "strengthening hoops"); these ridges contribute to the structural integrity of the invention. The inside surface of the inner front wall 7 (that is, that side of the inner front wall 7 that faces the funnel-shaped intake 3) preferably also comprises a plurality of circumferential ridges 18 for the same reason.

Figure 5:
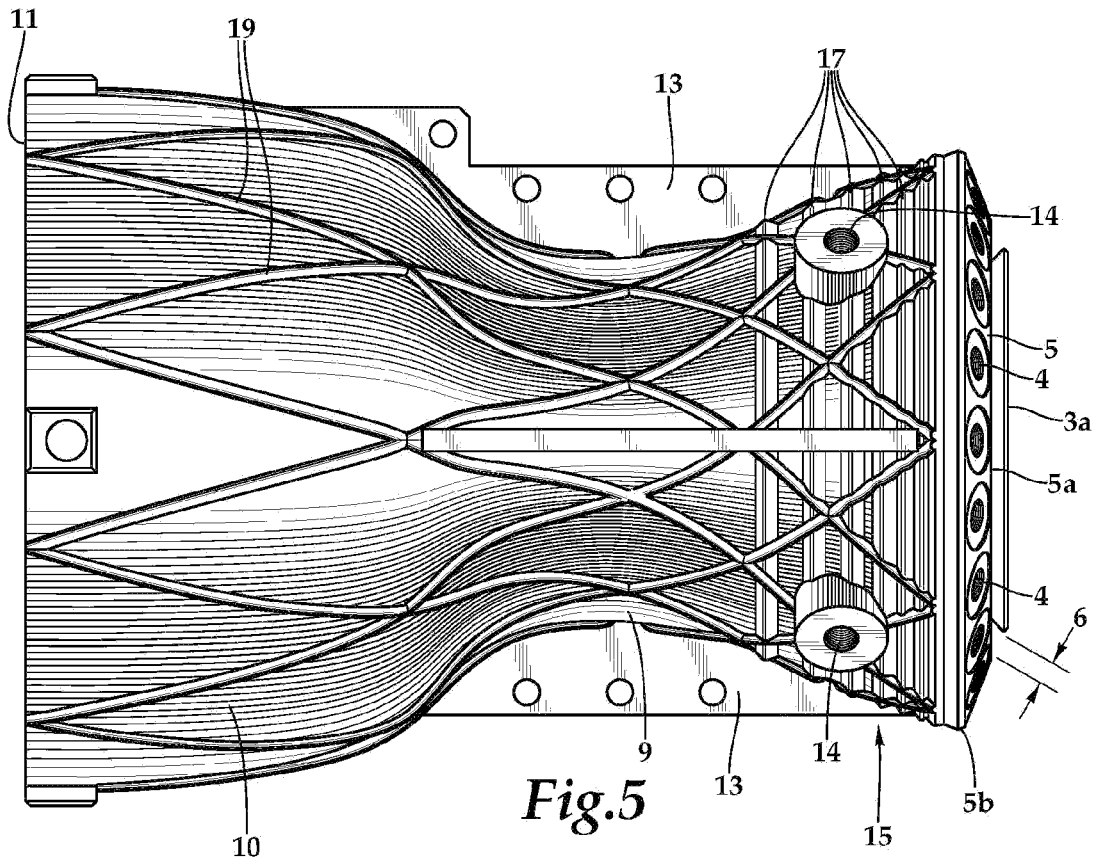
FIG. 5 is a side view of the present invention.

FIGS. 3 and 4 are front and rear views, respectively, of the present invention. FIG. 5 is a side view of the present invention. As shown in the latter figure, as well as FIGS. 1 and 2, the outer shell preferably comprises a crisscrossed pattern of external ridges 19 extending from the outer edge 5b of the circumferential front ledge 5 to the rear edge 11 of the invention. These external ridges 19 impart additional structural integrity to the invention. They preferably overlie the circumferential ridges 17 on the front end 15 of the outer shell 10.

FIG. 6 is a cross-section view of the present invention taken at the line shown in FIG. 5. Note that the intake 3 preferably tapers to a point ("X" on FIG. 6) and then expands outward toward the floor 8 (the outward expansion of the outer wall 3b of the intake 3 forms the skirt 8b). In a preferred embodiment, the width of the floor ("Y" on FIG. 6) is greater than "X" (which is the width of the central aperture 20) but less than the width of the intake 3 at the front edge 3a (depicted as "Z" on FIG. 6). In a preferred embodiment, the floor 8 is not flat but rather angled upwards toward the central aperture 20.

Figure 7:
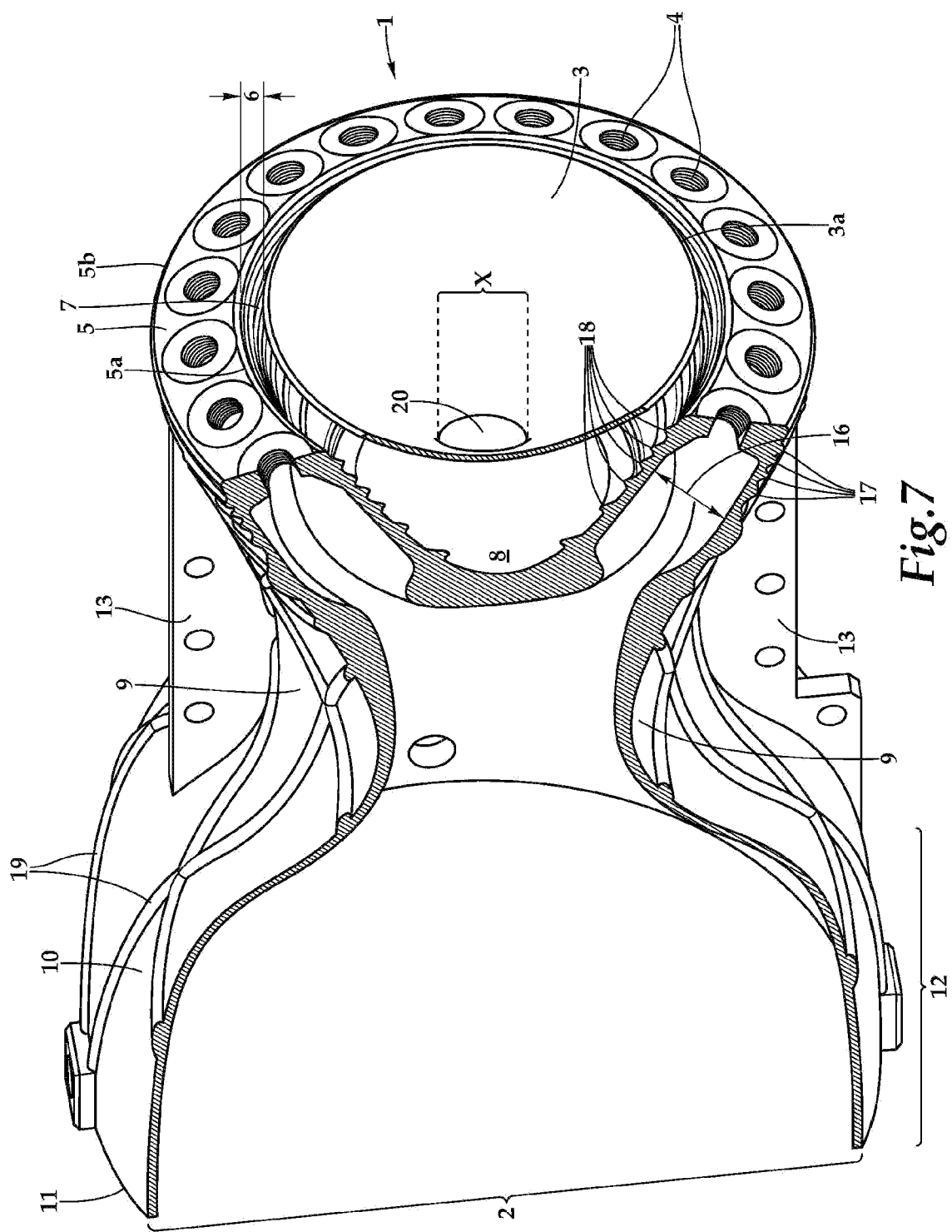
FIG. 7 is a front cutaway perspective view of the present invention.

FIG. 7 is a front cutaway perspective view of the present invention. This figure shows the tapering of the intake 3 (from front to rear) to point "X" and then the broadening of the intake 3 (again, from front to rear) to form the floor 8. Note that the central aperture 20 of the intake 3 (formed by the taper point "X") is in fluid communication with (that is, open to) the throat 9 and exhaust 12 portions of the invention (see also FIGS. 4 and 6).

Figure 8:
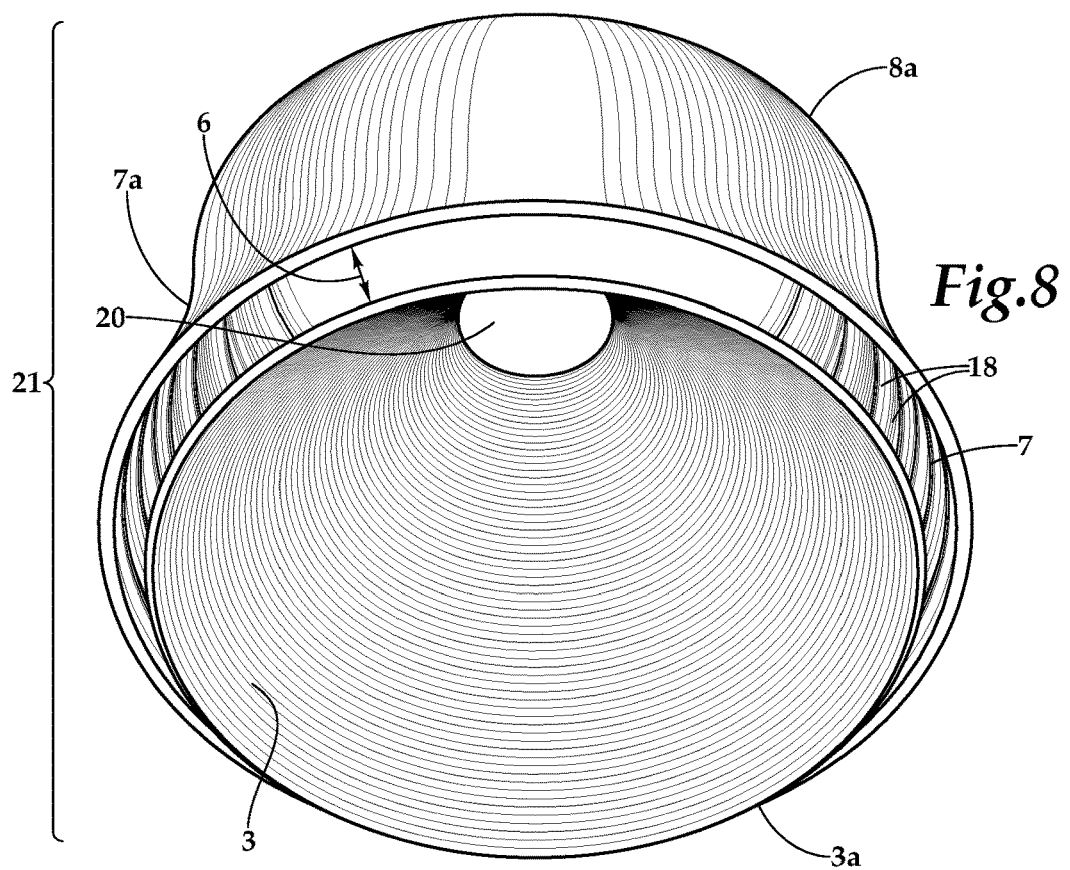
FIG. 8 is a front perspective view of the interior portion of the invention.
Figure 9:
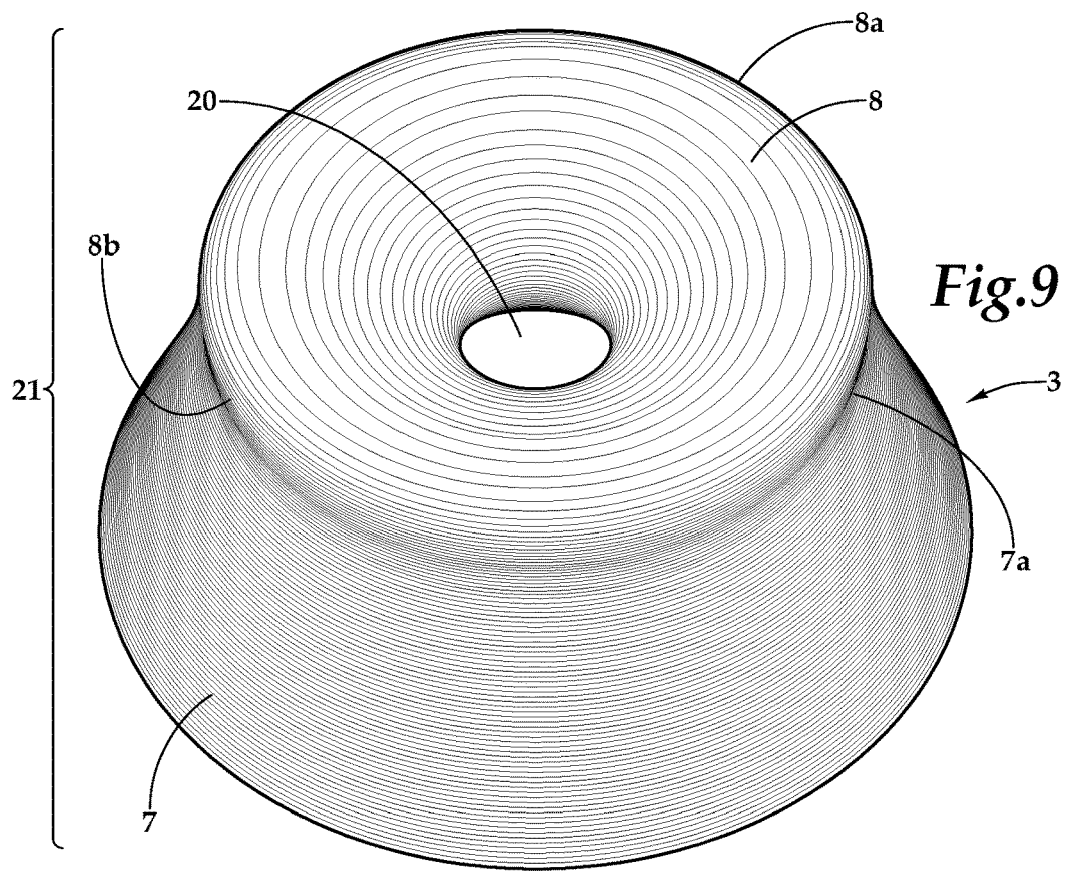
FIG. 9 is a rear perspective view of the interior portion of the invention.

FIG. 8 is a front perspective view of the interior portion of the invention, and FIG. 9 is a rear perspective view of the interior portion of the invention. In these two figures, the outer shell 10 and circumferential ledge 5 (with the fuel and oxidizer ports 4) have been removed to better illustrate the interior portion of the engine. The interior portion 21 of the invention comprises the intake 3, inner front wall 7 and floor 8 (the outer wall 3b of the intake and the inner front wall 7 being joined at the skirt 8b, as explained above). Although the first circumferential gap 6 is shown, the second circumferential gap 16 is not shown because the outer shell 10 has been removed.

Note that the perimeter of the floor 8 is preferably bulbous in shape with a rounded circumferential outer edge 8a. The inner front wall 7 tapers inward at its center 7a (see also FIG. 6). That part of the second circumferential gap 16 that lies between the center 7a of the inner front wall 7 and the outer shell 10 forms a toroidal combustion chamber. As noted above, the floor 8 demarcates the rear of the front end 1 and the front of the throat area 9 of the invention (see FIG. 6); thus, the entire interior portion 21 of the invention is situated within the front end 1 of the engine.

Figure 10:
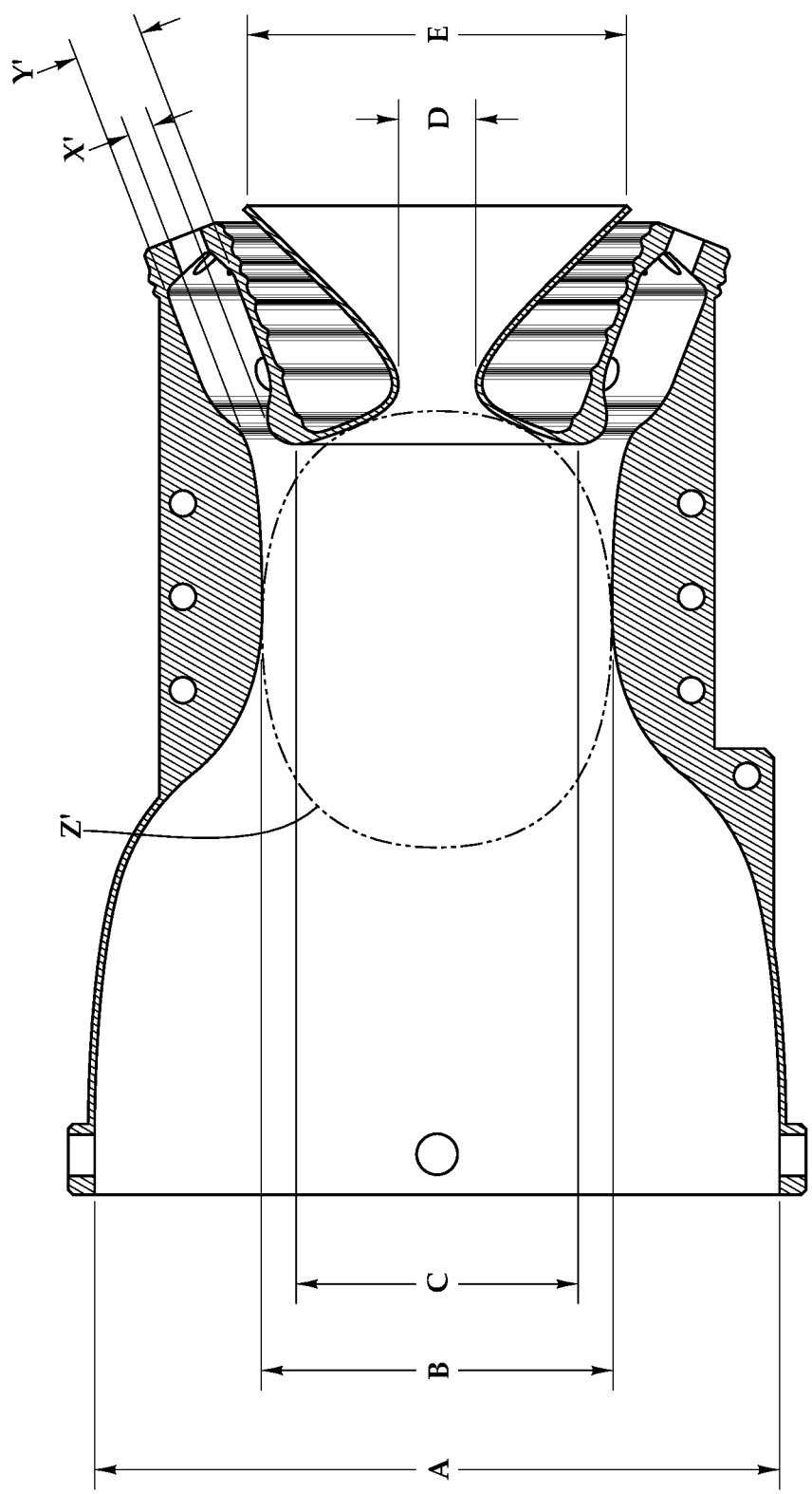
FIG. 10 is a cross-section view of the present invention taken at the line shown in FIG. 5 and including dimensional annotations.

FIG. 10 is the same view as shown in FIG. 6; this figure includes annotations regarding certain dimensional features of the invention. Dimension "A" is the inside diameter of the exhaust 12 at the rear edge 11. Dimension "B" is the inner diameter of the invention at the center part of the throat area 9. Dimension "C" is the distance between the two rear-most points of the floor 8 of the intake 3 (also denoted as "Y" on FIG. 6). Dimension "D" is the inner diameter of the intake 3 at the choke point denoted as "X" on FIG. 6. Dimension "E" is the inner diameter of the intake 3 at the front edge 3a denoted as "Z" on FIG. 6. Dimension X' is the inner diameter of the second circumferential gap 16 at the point at which fluid exiting the gap 16 enters the throat area 9. Dimension Y' is the inner diameter of the second circumferential gap 16 at its center (and along most of the length of the gap 16 until it tapers to dimension X').

In a preferred embodiment, with reference to the dimensions shown in FIG. 10, dimension "B" is approximately one-half (0.5) of dimension "A." Dimension "C" is approximately 0.4 of dimension "A" and approximately 0.8 of dimension "B." Dimension "D" is approximately 0.1 of dimension "A," 0.2 of dimension "B," and 0.25 of dimension "C." Dimension "E" is preferably five times (5.0) that of dimension "D." In a preferred embodiment, the ratio of X' to Y' is 0.38. The afore-mentioned dimensions have been optimized to provide maximum fuel efficiency and thrust.

As will be apparent to those skilled in the art of fluid dynamics, the present invention is designed to take advantage of Bernoulli's principle, namely, that an increase in the velocity of a stream of fluid results in a decrease in pressure. This principle is applied in the context of the present invention at both dimension X' and dimension C. These are two places within the structure of the invention where fluids are compressed and then released into an area of greater volume, thereby creating a Venturi effect. Within the context of the present invention, there are two vacuums created—one where the toroidal combustion chamber 16 expels fluid into the throat area 9 and another where the intake 3 expels fluid into the throat area 9. The invention is designed so that both of these vacuums occur at the front end of the throat area and are aligned with each other laterally (see FIG. 6). Outside air is also partially drawn in according to the principles of the Bernoulli effect, which completes mixing of the non-combusted fuel passed to this area from the primary combustion chamber.

In operation, the propellant (fuel and oxidizer) is injected into the toroidal combustion chamber (i.e., the second circumferential gap 16), squeezed at dimension X', and then expelled from the toroidal combustion chamber and into the throat area 9 at a relatively high velocity. The fluid is at its highest velocity (and lowest pressure) at this point, thereby creating a vacuum that draws ambient fluid in through the center of the intake 3 and into the throat area 9, where the ambient fluid mixes with a fuel-rich, high-speed combustion stream. The fluid temperature is at its highest inside the toroidal combustion chamber, where initial combustion takes place, and the flame from the toroidal combustion chamber 16 extends into the throat area 9 and through the center of the exhaust 12. The ambient air, which is at a relatively cooler temperature, enters through the intake 3 and mixes with the hot air in the throat area 9 to complete combustion of the fuel-enriched combustion stream from initial combustion.

In the present invention, combustion occurs both in the toroidal combustion chamber (the second circumferential gap 16), where the fuel from the injector ports 4 is oxidized (this is the primary combustion chamber), and in the throat area 9 where the ambient air from the intake 3 mixes with the hot gasses from the toroidal combustion chamber (this is the secondary combustion chamber). It is in the secondary combustion chamber that the ambient fluid is used as reaction mass. If the ambient fluid contains oxidizer, it is then used to complete combustion; if it does not, it simply acts as free reaction mass. The secondary combustion chamber is denoted as Z' in FIG. 10. Because the invention uses ambient fluid as reaction mass, a rocket with the present invention for its engine would be required to carry less oxidizer than a conventional rocket engine. Put simply, a conventional rocket carries all of the required fuel and oxidizer, whereas a conventional jet engine carries all of the required fuel and no oxidizer (it uses ambient air as the oxidizer). The present invention is neither a conventional rocket engine nor a conventional jet engine because it carries both fuel and oxidizer but requires less oxidizer than a conventional rocket engine. It should be noted that wherever references are made herein to "ambient air," other fluids may be substituted for the ambient air. The term "ambient fluid" includes, but is not limited to, ambient air.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:
1. An engine comprising:
  (a) an outer shell, the outer shell being hourglass-shaped and having a front end, a throat area, and an exhaust, the throat area being situated between the front end and the exhaust, the throat area have a smaller inner diameter than the front end or the exhaust;
  (b) a funnel-shaped intake situated at least partially inside of the front end of the outer shell and terminating in a floor;
  (c) a circumferential front ledge forming a perimeter of the front end of the outer shell, the circumferential front ledge comprising one or more injector ports; and
  (d) at least one ignition port situated on an outside of the outer shell on the front end of the outer shell between the circumferential front ledge and the throat area;
  wherein the circumferential front ledge comprises an inner edge and an outer edge;
  wherein an inner front wall extends from the inner edge of the circumferential front ledge to the floor;
  wherein the intake comprises an outer wall that forms a skirt over the floor;
  wherein the outer wall of the intake, the inner front wall, and the skirt are configured to form a first circumferential gap between the intake and the inner front wall, the first circumferential gap not being in fluid communication with the throat or the exhaust;
  wherein the first circumferential gap has an inner diameter, and the inner diameter of the first circumferential gap widens from a front end of the first circumferential gap to the skirt;
  wherein the inner front wall comprises an outer surface, wherein the outer shell comprises an inner surface, and wherein the outer surface of the front inner wall and the inner surface of the front end of the outer shell are configured to form a second circumferential gap, the second circumferential gap being in fluid communication with the at least one injector port and the at least one ignition port;
  wherein the second circumferential gap has an inner diameter, and the inner diameter of the second circumferential gap decreases at a terminal end of the second circumferential gap, the terminal end of the second circumferential gap being aligned laterally with the floor;

wherein the second circumferential gap is in fluid communication with the throat and exhaust;

wherein the intake has an inner diameter that decreases from a front edge of the intake to a point forward of the floor and increases from said point to the floor;

wherein the intake comprises a central aperture that extends from the front edge of the intake to the floor and is in fluid communication with the throat area and exhaust;

wherein the throat area comprises a front end, and the terminal end of the second circumferential gap is situated at the front end of the throat area;

wherein the throat area is in fluid communication with the exhaust; and wherein the central aperture of the intake terminates at the front end of the throat area.

2. The engine of claim 1, wherein the outer shell comprises an outer surface, and wherein the outer surface of the outer shell comprises a plurality of crisscrossed ridges.

3. The engine of claim 1, wherein the inner front wall comprises an inner surface, and wherein the inner surface of the inner front wall comprises a plurality of circumferential ridges.

4. The engine of claim 1, wherein the front end of the first circumferential gap is open to the atmosphere.

5. The engine of claim 1, wherein the outer edge of the circumferential front ledge has a diameter, the outer shell comprises a rear edge, the rear edge is circular in shape, the rear edge has an outer diameter, and the outer diameter of the rear edge of the outer shell is greater than the diameter of the outer edge of the front circumferential ledge.

6. The engine of claim 1, wherein the floor has a perimeter, and the perimeter of the floor is bulbous in shape with a rounded circumferential outer edge.

7. The engine of claim 6, wherein the floor is angled toward both the central aperture and the front edge of the intake.

8. The engine of claim 1, wherein the floor has a width, the central aperture has a width, and the front edge of the intake has a width; and wherein the width of the floor is greater than the width of the central aperture but less than the width of the front edge of the intake.

9. The engine of claim 5, wherein the throat area comprises a center part with an inner diameter, the rear edge of the outer shell has an inner diameter, and the inner diameter of the center part of the throat area is approximately 0.5 times the inner diameter of the rear edge of the outer shell.

10. The engine of claim 1, wherein the inner diameter of the second circumferential gap is constant except at the terminal end, and the inner diameter of the second circumferential gap at the terminal end is approximately 0.38 times the inner diameter of the second circumferential gap other than at the terminal end.

* * * * *